(12) United States Patent
Okuyama (10) Patent No.: US 7,430,105 B2
(45) Date of Patent: Sep. 30, 2008

(54) MULTI-TERMINAL TYPE LAMINATED CAPACITOR

(75) Inventor: Hiroshi Okuyama, Tokyo (JP)

(73) Assignee: TDK Corporation, Tokyo (JP)

( * ) Notice: Subject to any disclaimer, the term of this patent is extended or adjusted under 35 U.S.C. 154(b) by 204 days.

(21) Appl. No.: 11/354,102

(22) Filed: Feb. 15, 2006

(65) Prior Publication Data

US 2006/0203420 A1   Sep. 14, 2006

(30) Foreign Application Priority Data

Mar. 10, 2005   (JP) ............................. 2005-067034

(51) Int. Cl.
  *H01G 4/005*  (2006.01)
  *H01G 4/228*  (2006.01)
(52) U.S. Cl. .................... 361/303; 361/306.3
(58) Field of Classification Search ......... 361/303–305, 361/311–312, 306.1, 306.2, 306.3, 309, 320, 361/323
See application file for complete search history.

(56) References Cited

U.S. PATENT DOCUMENTS 4,584,628 A * 4/1986 Cichanowski ............... 361/309

6,960,366 B2 * 11/2005 Ritter et al. .................... 427/79

FOREIGN PATENT DOCUMENTS

| JP | 2000-208361 | | 7/2000 |
| JP | 2002260949 | A * | 9/2002 |
| JP | 2003282356 | A * | 10/2003 |
| JP | 2005175165 | A * | 6/2005 |

* cited by examiner

*Primary Examiner*—Eric Thomas
(74) *Attorney, Agent, or Firm*—Oblon, Spivak, McClelland, Maier & Neustadt, P.C.

(57) ABSTRACT

Electrode layers 121 to 128 are superimposed in a ceramic porcelain 1 with ceramic layers therebetween. The electrode layers 121 to 128 respectively include internal electrodes A1 to A8 and extraction electrodes B1 to B8. Giving a description on the electrode layer 121, one end of the extraction electrode B1 is connected with the internal electrode A1 in the same layer, and the other end of the same is led onto a side surface of the ceramic porcelain 1. Further, the extraction electrode B1 is formed to be thicker than the internal electrode A1 in the same layer.

6 Claims, 7 Drawing Sheets

MULTI-TERMINAL TYPE LAMINATED CAPACITOR

BACKGROUND OF THE INVENTION

1. Field of the Invention

The present invention relates to a multi-terminal type laminated capacitor and a manufacturing method thereof.

2. Description of the Related Art

In an electric supply source of a central processing unit (CPU) mounted in a digital electronic device, a reduction in voltage advances while a load current is increased. Therefore, suppressing a fluctuation in power supply voltage within an allowable value range with respect to a sudden change in load current becomes very difficult, and hence a laminated capacitor called a decoupling capacitor is connected with a power supply. Further, at the time of a transitional fluctuation in load current, a current is supplied from this laminated capacitor to a CPU, thereby suppressing a fluctuation in power supply voltage.

In recent years, with a further increase in an operating frequency of a CPU, a load current and its speed are increased. Therefore, in the laminated capacitor used as the decoupling capacitor, there is a demand for an increase in equivalent series resistance (ESR).

In a multi-terminal type laminated capacitor disclosed in Japanese Patent Application Laid-open No. 2000-208361, an extraction electrode for connection with a terminal electrode is provided to an internal electrode in each layer, and such an extraction electrode is led onto a side surface of a ceramic porcelain. The terminal electrode is formed on the side surface of the ceramic porcelain by plating or the like and joined to the extraction electrode. The terminal electrode is appressed against the ceramic porcelain through a joining structure with respect to the extraction electrode.

In order to obtain a high ESR in this type of laminated capacitor, there can be considered a technique which reduces a film thickness of the internal electrode provided in each layer.

However, in the technology described in Japanese Patent Application Laid-open No. 2000-208361, since the film thickness of the extraction electrode is the same as the film thickness of the internal electrode, reducing the film thickness of the internal electrode decreases the film thickness of the extraction electrode. When the film thickness of the extraction electrode is reduced, a sufficient joining structure cannot be provided to the terminal electrode, and hence it is difficult to assure the adhesion of the terminal electrode with respect to the ceramic porcelain.

As another means for increasing the ESR, a technique of reducing the number of layers can be considered. However, when the number of layers is reduced, the number of extraction electrodes is also decreased. In the technology described in Japanese Patent Application Laid-open No. 2000-208361, the film thickness of the extraction electrode is the same as the film thickness of the internal electrode. Therefore, when the number of the extraction electrodes is reduced, a sufficient joining structure cannot be provided to the terminal electrode, and hence it is difficult to assure the adhesion of the terminal electrode with respect to the ceramic porcelain.

SUMMARY OF THE INVENTION

It is an object of the present invention to provide a multi-terminal type laminated capacitor and a manufacturing method thereof which can assure the adhesion of a terminal electrode with respect to a ceramic porcelain even if the number of layers is reduced or a film thickness of an internal electrode is reduced in order to increase an ESR.

<Multi-Terminal Type Laminated Capacitor>

To achieve this object, according to the present invention, there is provided a multi-terminal type laminated capacitor comprising: a ceramic porcelain; and a plurality of electrode layers superimposed in the ceramic porcelain with ceramic layers therebetween.

Each electrode layer includes an internal electrode and an extraction electrode. The extraction electrode has one end connected with the internal electrode in the same layer and the other end led onto a side surface of the ceramic porcelain, and is formed to be thicker than the internal electrode in the same layer.

As described above, according to the multi-terminal type laminated capacitor of the present invention comprises the ceramic porcelain and the plurality of electrode layers superimposed in the ceramic porcelain with the ceramic layers therebetween. Therefore, a basic configuration of the multi-terminal type laminated capacitor can be obtained.

Each electrode layer includes the internal electrode and the extraction electrode. One end of the extraction electrode is connected with the internal electrode in the same layer, and the other end of the same is led onto the side surface of the ceramic porcelain. Therefore, the terminal electrode can be formed on the side surface of the ceramic porcelain, thereby providing the joining structure with respect to the extraction electrode.

In the present invention, the extraction electrode is formed to be thicker than the internal electrode in the same layer. According to this configuration, even if the number of layers is reduced or a film thickness of the internal electrode is decreased in order to increase the ESR, a film thickness which is required for the joining structure with respect to the terminal electrode can be assured for the extraction electrode. Therefore, the sufficient joining structure can be provided to the terminal electrode, and the adhesion of the terminal electrode with respect to the ceramic porcelain can be assured. Accordingly, exfoliation of the terminal electrode due to a thermal shock can be avoided.

Preferably, the extraction electrode is formed to be thicker than the internal electrode in the same layer in the vicinity of the side surface of the ceramic porcelain.

In one embodiment, the electrode layer further includes a dummy electrode, and the dummy electrode is arranged apart from the internal electrode and the extraction electrode in the same layer, and has one end led onto the side surface of the ceramic porcelain. According to this configuration, a joining structure with respect to the dummy electrode as well as the joining structure with respect to the extraction electrode can be provided to the terminal electrode, thereby increasing the adhesion of the terminal electrode with respect to the ceramic porcelain.

In at least one of the electrode layers, it is preferable that the dummy electrode has the same polarity as seen from a relationship with the internal electrode in the same layer. When the dummy electrode has the same polarity as seen from the relationship with the internal electrode in the same layer, a short-circuit defect between the dummy electrode and the internal electrode can be avoided.

In another embodiment, the ceramic porcelain has an inner layer portion having the electrode layers superimposed with the ceramic layers therebetween and an outer layer portion positioned outer as seen from the inner layer portion, the outer layer portion having a dummy electrode layer. The dummy electrode layer includes an outer layer dummy electrode, an the outer layer dummy electrode has one end led onto a side surface of the ceramic porcelain. According to this configuration, the terminal electrode can be provided with the joining structure with respect to the extraction electrode as well as a joining structure with respect to the outer layer dummy electrode, thereby increasing the adhesion of the terminal electrode with respect to the ceramic porcelain.

<Manufacturing Method of Multi-Terminal Type Laminated Capacitor>

In a manufacturing method of a multi-terminal type laminated capacitor according to the present invention, an internal electrode layer and a first extraction electrode layer are formed on an unbaked ceramic sheet. Further, a second extraction electrode layer is formed on the first extraction electrode layer. Furthermore, a laminated body is formed such that the unbaked ceramic sheet having the internal electrode layer and the first and second extraction electrode layers formed thereon is used as a unit layer in the laminated body.

As described above, in the manufacturing method of the multi-terminal type laminated capacitor according to the present invention, the internal electrode layer and the first extraction electrode layer are formed on the unbaked ceramic sheet, and the second extraction electrode layer is formed on the first extraction electrode layer. Therefore, it is possible to obtain a basic configuration including the internal electrode and the extraction electrode which is formed to be thicker than the internal electrode in the same layer.

Moreover, the laminated body is formed such that the unbaked ceramic sheet having the internal electrode layer and the first and second extraction electrode layers formed thereon is used as a unit layer in the laminated body. Therefore, the multi-terminal type laminated capacitor according to the present invention can be obtained.

In one embodiment, the second extraction electrode layer is constituted of a plurality of layers.

In another embodiment, a step absorption layer made of a ceramic paste is formed on the internal electrode layer. Then, a laminated body is formed such that the unbaked ceramic sheet having the internal electrode layer, the first and second extraction electrode layers and the step absorption layer formed thereon is used as a unit layer in the laminated body. According to such a step absorption layer, a step generated between the internal electrode layer and the second extraction electrode layer can be absorbed.

As described above, according to the present invention, even if the number of the layers is reduced or a film thickness of the internal electrode is decreased in order to increase the ESR, it is possible to provide the multi-terminal type laminated capacitor and the manufacturing method thereof which can assure the adhesion of the terminal electrode with respect to the ceramic porcelain.

DESCRIPTION OF THE PREFERRED EMBODIMENTS

<Multi-Terminal Type Laminated Capacitor>

Figure 1:
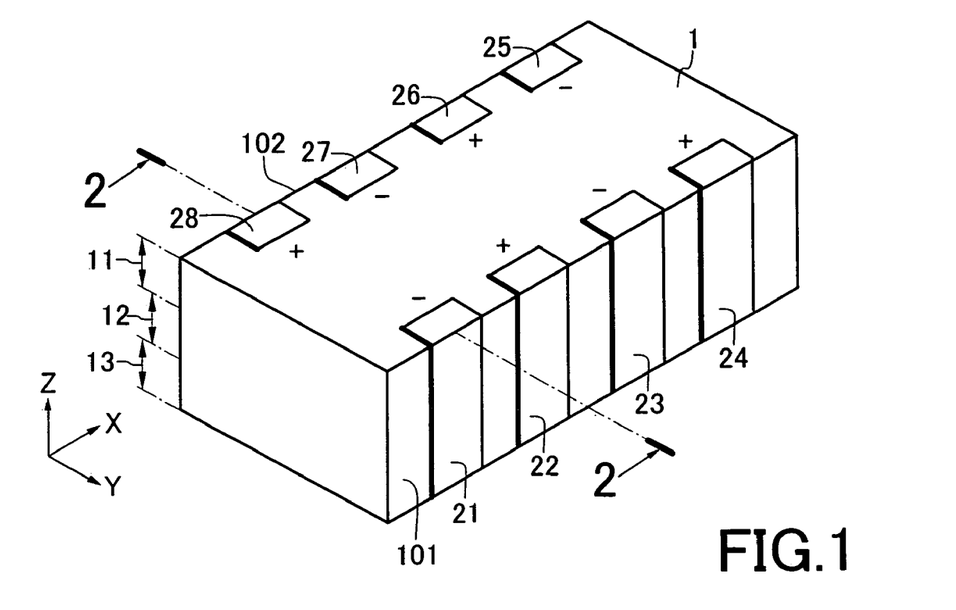
FIG. 1 is an appearance perspective view according to an embodiment of a multi-terminal type laminated capacitor according to the present invention.
Figure 2:
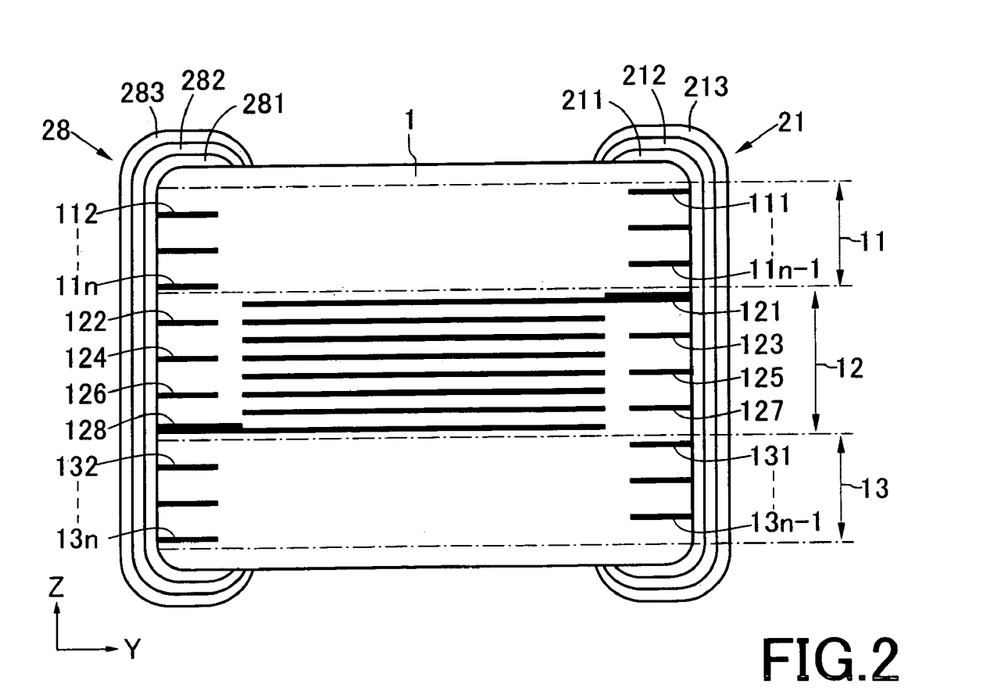
FIG. 2 is a pattern diagram showing a cross section taken along a line 2-2 in FIG. 1.

FIG. 1 is an appearance perspective view showing an embodiment of a multi-terminal type laminated capacitor according to the present invention, and FIG. 2 is a pattern diagram showing a cross section taken along a line 2-2 in FIG. 1. As shown in the drawings, a multi-terminal type laminated capacitor according to the present invention includes a ceramic porcelain 1 and a plurality of electrode layers 121 to 128.

The ceramic porcelain 1 is formed of a dielectric material or the like mainly containing, e.g., barium titanate. The ceramic porcelain 1 has a substantially rectangular parallelepiped shape having a length direction X, a width direction Y and a thickness direction Z, and terminal electrodes 21 to 24 are provided on one side surface 101 as seen from the width direction Y. These terminal electrodes 21 to 24 are arranged on the side surface 101 at intervals in the length direction X, and the adjacent terminal electrodes have polarities different from each other. Specifically, the terminal electrodes 21 and 23 have a negative polarity, and the terminal electrodes 22 and 24 have a positive polarity.

Terminal electrodes 25 to 28 are likewise provided on the other side surface 102 of the ceramic porcelain 1. These terminal electrodes 25 to 28 are arranged on the side surface 102 at intervals in the length direction X, and the adjacent terminal electrodes have polarities different from each other. Specifically, the terminal electrodes 25 and 27 have a negative polarity, and the terminal electrodes 26 and 28 have a positive polarity.

The terminal electrodes 21 to 28 can be constituted of single-layer or multilayer plating films (212 to 282) and (213 to 283) on underlying films 211 to 281 obtained by applying an electroconductive paste on the ceramic porcelain 1 and baking this paste. The underlying films 211 to 281 are constituted to mainly contain, e.g., Cu or Ag, and the plating films are formed of multilayer plating films (212 to 282) and (213 to 283) of, e.g., Ni/Sn.

Referring to FIG. 2, the electrode layers 121 to 128 are superimposed in the ceramic porcelain 1 with ceramic layers held therebetween. Giving a detailed explanation, the ceramic porcelain 1 consists of an inner layer portion 12, a first outer layer portion 11 positioned above the inner layer portion 12 and a second outer layer portion 13 positioned below the inner layer portion 12, and the electrode layers 121 to 128 are arranged in the inner layer portion 12 of the ceramic porcelain 1. The electrode layers 121 to 128 are formed of, e.g., Ni.

Figure 3:
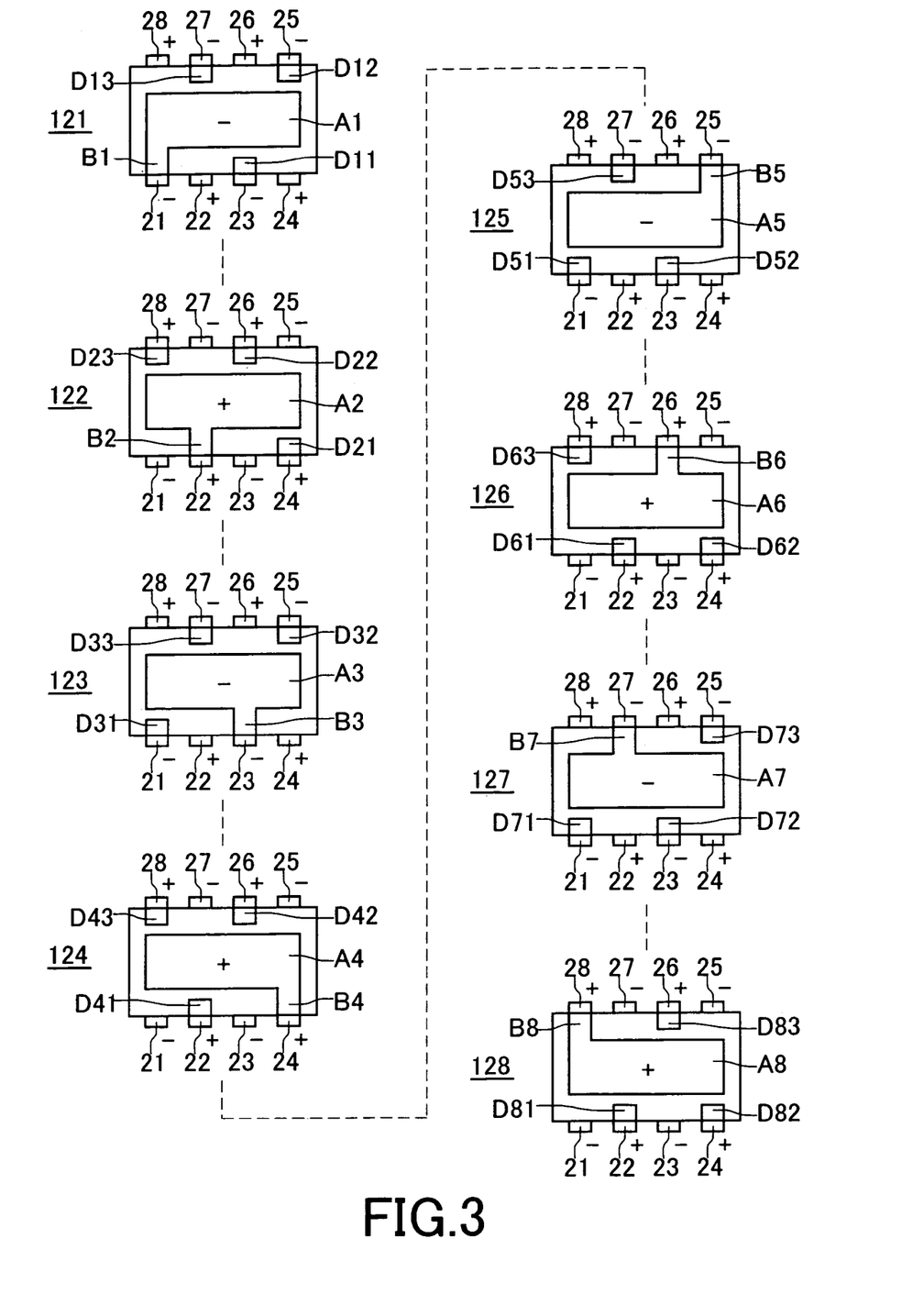
FIG. 3 is a pattern diagram showing configurations of electrode layers.

FIG. 3 is a pattern diagram showing configurations of the electrode layers 121 to 128. The electrode layers 121 to 128 will now be sequentially described hereinafter.

First, giving a description on the electrode layer 121, the electrode layer 121 includes an internal electrode A1 and an extraction electrode B1. The internal electrode A1 is provided to face an internal electrode A2 in the electrode layer 122 with a dielectric layer therebetween, and functions as a capacitance electrode. The extraction electrode B1 has one end connected with the internal electrode A1 in the same layer and the other end led onto one side surface of the ceramic porcelain to be connected with the terminal electrode 21. Therefore, the internal electrode A1 is electrically connected with the terminal electrode 21 through the extraction electrode B1, and hence has the same polarity as that of the terminal electrode 21, i.e., the negative polarity.

The electrode layer 121 further includes dummy electrodes D11 to D13. The dummy electrodes D11 to D13 are respectively arranged apart from the internal electrode A1 and the extraction electrode B1 in the same layer. Further, each of these dummy electrodes D11 to D13 is connected with a terminal electrode selected from the terminal electrodes 21 to 28 in such a manner that each dummy electrode has the same polarity as seen from a relationship with the internal electrode A1 in the same layer. Giving a detailed explanation, the internal electrode A1 has a negative polarity, and one end of the dummy electrode D11 is led onto one side surface of the ceramic porcelain to be connected with the terminal electrode 23 having a negative polarity. One end of each of the dummy electrodes D12 and D13 is led onto the other side surface of the ceramic porcelain to be connected with each of the terminal electrodes 25 and 27 having a negative polarity.

Giving a description on the electrode layer 122, the electrode layer 122 includes an internal electrode A2 and an extraction electrode B2. The internal electrode A2 is provided to face the internal electrode A1 in the electrode layer 121 and an internal electrode A3 in the electrode layer 123, and function as a capacitance electrode. One end of the extraction electrode B2 is connected with the internal electrode A2 in the same layer, and the other end of the same is led onto one side surface of the ceramic porcelain to be connected with the terminal electrode 22. Therefore, the internal electrode A2 is electrically connected with the terminal electrode 22 through the extraction electrode B2, and hence has the same polarity as the terminal electrode 22, i.e., a positive polarity.

The electrode layer 122 further includes dummy electrodes D21 to D23, and the dummy electrodes D21 to D23 are respectively arranged apart from the internal electrode A2 and the extraction electrode B2 in the same layer. Further, each of these dummy electrodes D21 to D23 is connected with a terminal electrode selected from the terminal electrodes 21 to 28 in such a manner that each dummy electrode has the same polarity as seen from a relationship with the internal electrode A2 in the same layer. Giving a detailed explanation, the internal electrode A2 has a positive polarity, and one end of the dummy electrode D21 is led onto one side surface of the ceramic porcelain to be connected with the terminal electrode 24 having a positive polarity. One end of each of the dummy electrodes D22 and D23 is led onto the other side surface of the ceramic porcelain to be connected with each of the terminal electrodes 26 and 28 having a positive polarity.

This is also applied to the electrode layers 123 to 128, and hence the tautological explanation of these layers will be eliminated as much as possible.

Giving a description on the electrode layer 123, one end of an extraction electrode B3 is connected with an internal electrode A3 in the same layer, and the other end of the same is led onto the side surface of the ceramic porcelain to be connected with the terminal electrode 23. Therefore, the internal electrode A3 is electrically connected with the terminal electrode 23 through the extraction electrode B3, and hence has the same polarity as the terminal electrode 23, i.e., a negative polarity. Dummy electrodes D31 to D33 are respectively connected with the terminal electrodes 21, 25 and 27 having a negative polarity in such a manner that these dummy electrodes have the same polarity as seen from a relationship with the internal electrode A3 in the same layer.

Giving a description on the electrode layer 124, one end of an extraction electrode B4 is connected with an internal electrode A4 in the same layer, and the other end of the same is led onto the side surface of the ceramic porcelain to be connected with the terminal electrode 24. Therefore, the internal electrode A4 is electrically connected with the terminal electrode 24 through the extraction electrode B4, and hence has the same polarity as the terminal electrode 24, i.e., a positive polarity. Dummy electrodes D41 to D43 are respectively connected with the terminal electrodes 22, 26 and 28 having a positive polarity in such a manner that these dummy electrodes have the same polarity as seen from a relationship with the internal electrode A4 in the same layer.

Giving a description on the electrode layer 125, one end of an extraction electrode B5 is connected with an internal electrode A5 in the same layer, and the other end of the same is led onto the side surface of the ceramic porcelain to be connected with the terminal electrode 25. Therefore, the internal electrode A5 is electrically connected with the terminal electrode 25 through the extraction electrode B5, and hence has the same polarity as the terminal electrode 25, i.e., a negative polarity. Dummy electrodes D51 to D53 are respectively connected with the terminal electrodes 21, 23 and 27 having a negative polarity in such a manner that these dummy electrodes D51 to D53 have the same polarity as seen from a relationship with the internal electrode A5 in the same layer.

Giving a description on the electrode layer 126, one end of an extraction electrode B6 is connected with an internal electrode A6 in the same layer, and the other end of the same is led onto the side surface of the ceramic porcelain to be connected with the terminal electrode 26. Therefore, the internal electrode A6 is electrically connected with the terminal electrode 26 through the extraction electrode B6, and hence has the same polarity as the terminal electrode 26, i.e., a positive polarity. Dummy electrodes D61 to D63 are respectively connected with the terminal electrodes 22, 24 and 28 having a positive polarity in such a manner that these dummy electrodes have the same polarity in a relationship with the terminal electrode A6 in the same layer.

Giving a description on the electrode layer 127, one end of an extraction electrode B7 is connected with an internal electrode A7 in the same layer, and the other end of the same is led onto the side surface of the ceramic porcelain to be connected with the terminal electrode 27. Therefore, the internal electrode A7 is electrically connected with the terminal electrode 27 through the extraction electrode B7, and hence has the same polarity as the terminal electrode 27, i.e., a negative polarity. Dummy electrodes D71 to D73 are respectively connected with the terminal electrodes 21, 23 and 25 having a negative polarity in such a manner that these dummy electrodes have the same polarity in a relationship with the internal electrode A7 in the same layer.

Finally, giving a description on the electrode layer 128, one end of an extraction electrode B8 is connected with an internal electrode A8 in the same layer, and the other end of the same is led onto the side surface of the ceramic porcelain to be connected with the terminal electrode 28. Therefore, the internal electrode A8 is electrically connected with the terminal electrode 28 through the extraction electrode B8, and hence has the same polarity as the terminal electrode 28, i.e., a positive polarity. Dummy electrodes D81 to D83 are respectively connected with the terminal electrodes 22, 24 and 26 having a positive polarity in such a manner that these dummy electrodes have the same polarity in a relationship with the internal electrode A8 in the same layer.

The basic configuration of each of the electrode layers 121 to 128 is as described above. A detailed configuration of the same will now be described while taking the electrode layer 121 as an example.

Figure 4:
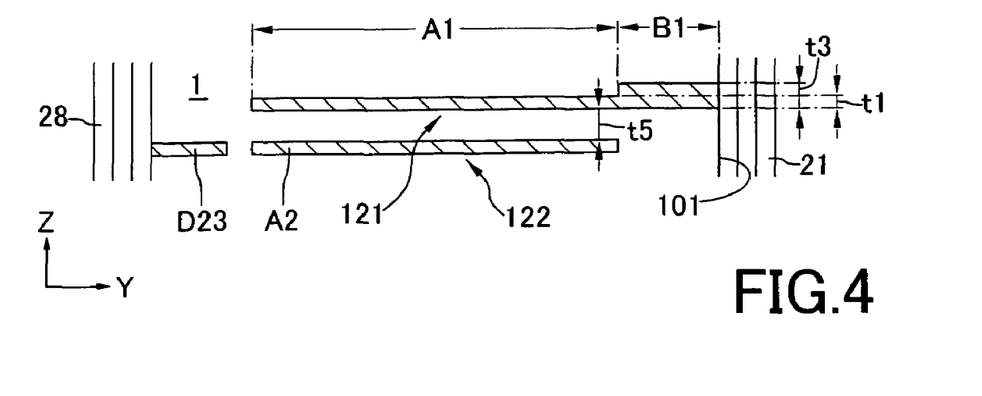
FIG. 4 is a view showing a part in the vicinity of the electrode layers 121 and 122 in an enlarged manner in relation to the cross section depicted in FIG. 2.

FIG. 4 is an enlarged view of a part in the vicinity of the electrode layers 121 and 122 in relation to the cross section depicted in FIG. 2. Referring to FIG. 4, the extraction electrode B1 of the electrode layer 121 is integrally formed with the internal electrode A1 in the same layer.

Furthermore, the extraction electrode B1 is formed to be thicker than the internal electrode A1 in the vicinity of the side surface 101 of the ceramic porcelain 1. In more detail, a layer thickness t3 of the extraction electrode B1 is larger than a layer thickness t1 of the internal electrode A1. The layer thickness t3 of the extraction electrode B1 is a layer thickness as seen from a part in the vicinity of the side surface 101 of the ceramic porcelain 1, and the layer thickness t1 of the internal electrode A1 is a layer thickness of a substantive part which functions as a capacitance electrode.

The layer thickness t3 of the extraction electrode B1 is determined while considering the layer thickness t1 of the internal electrode A1, a layer thickness t5 of the ceramic layer as seen from a part between the internal electrodes, and others. A preferable range of the layer thickness t3 is as follows:

$$t1 < t3 < t5 \quad (1)$$

A more preferable range of the same is as follows:

$$1.5 \times t1 \leq t3 \leq 0.9 \times t5 \quad (2)$$

Giving numerical examples, when the layer thickness t1 of the internal electrode A1 is 2 μm and the layer thickness t5 of the ceramic layer as seen from the part between the internal electrodes is 6 μm, the layer thickness t3 of the extraction electrode B1 can be set to 4 μm.

The internal electrodes A2 to A8 and the extraction electrodes B2 to B8 in the electrode layers 122 to 128 can have the same configurations in the electrode layer 121.

Again referring to FIG. 2, a description will be given. The first outer layer portion 11 of the ceramic porcelain 1 is provided with dummy electrode layers 111 to 11$n$. Likewise, the second outer layer portion 13 is provided with dummy electrode layers 131 to 13$n$. These dummy electrode layers are formed of, e.g., Ni and superimposed with the ceramic layers held therebetween. The dummy electrode layers 111 to 11$n$ in the first outer layer portion 11 will now be described on behalf of the above-described dummy electrode layers.

Figure 5:
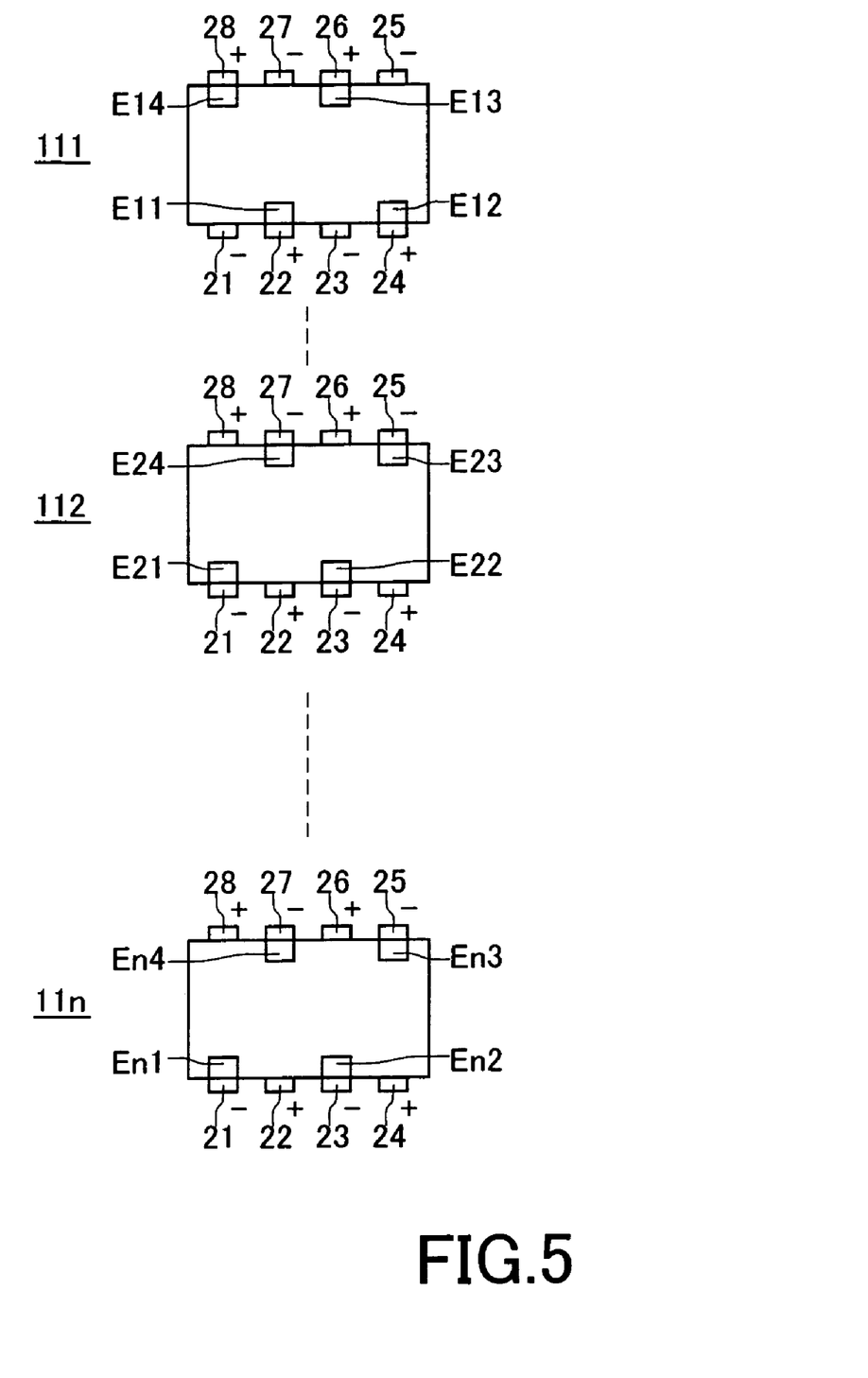
FIG. 5 is a pattern diagram showing configurations of dummy electrode layers.

FIG. 5 is a pattern diagram showing configurations of the dummy electrode layers 111 to 11$n$. First, the dummy electrode layer 111 will be described. The dummy electrode layer 111 includes outer layer dummy electrodes E11 to E14, and one end of each of the outer layer dummy electrode E11 to E14 is led onto the side surface of the ceramic porcelain to be connected with a terminal electrode selected from the terminal electrodes 21 to 28. In detail, the outer layer dummy electrodes E11 and E12 are led onto one side surface of the ceramic porcelain to be respectively connected with the terminal electrodes 22 and 24 having the positive polarity, and the outer layer dummy electrodes E13 and E14 are led onto the other side surface of the ceramic porcelain to be respectively connected with the terminal electrodes 26 and 28 having the positive polarity.

The dummy electrode layer 112 will now be described. The dummy electrode layer 112 includes outer layer dummy electrodes E21 to E24, and one end of each of the outer layer dummy electrodes E21 to E24 is led onto the side surface of the ceramic porcelain to be connected with a terminal electrode selected from the terminal electrodes 21 to 28. In detail, the outer layer dummy electrodes E21 and E22 are led onto one side surface of the ceramic porcelain to be respectively connected with the terminal electrodes 21 and 23 having the negative polarity, and the outer layer dummy electrodes E23 and E24 are led onto the other side surface of the ceramic porcelain to be respectively connected with the terminal electrodes 25 and 27 having the negative polarity.

The dummy electrode layers 113 to 11$n$ can have the same configuration. For example, of the dummy electrode layers 113 to 11$n$, a layer having an odd reference number may have the same configuration as the dummy electrode layer 111, and a layer having an even reference number may have the same configuration as the dummy electrode layer 112.

Furthermore, the dummy electrode layers 131 to 13$n$ in the second outer layer portion 13 can have the same configurations as the dummy electrode layers 111 to 11$n$ in the first outer layer portion 11. For example, the dummy electrode layers 131 to 13$n$ may have the same configurations as the dummy electrode layers 11$n$ to 111 so that a symmetrical configuration can be assured with the electrode layers 121 to 128 in the inner layer portion 12 at the center.

Moreover, each of the number of the dummy electrode layers arranged in the first outer layer portion 11 and the number of the dummy electrode layers arranged in the second outer layer portion 13 can take an arbitrary number.

As described above with reference to FIGS. 1 and 2, the multi-terminal type laminated capacitor according to the present invention includes the ceramic porcelain 1 and the plurality of electrode layers 121 to 128 superimposed in the ceramic porcelain 1 with the ceramic layers therebetween. Therefore, the basic configuration of the multi-terminal type laminated capacitor can be obtained.

Further, as described above with reference to FIG. 3, the electrode layers 121 to 128 include the internal electrodes A1 to A8 and the extraction electrodes B1 to B8. One end of each of these extraction electrodes B1 to B8 is connected with each of the internal electrodes A1 to A8 in the same layer, and the other end of the same is led onto the side surface of the ceramic porcelain 1. Therefore, the terminal electrodes 21 to 28 can be formed on the side surfaces of the ceramic porcelain 1, thereby providing the joining structures with respect to the extraction electrodes B1 to B8.

In the present invention, each of the extraction electrodes B1 to B8 is formed to be thicker than each of the internal electrodes A1 to A8 in the same layer. According to this configuration, even if the number of layers is reduced or a layer thickness of each of the internal electrodes A1 to A8 is decreased in order to increase the ESR, each of the extraction electrodes B1 to B8 can assure a layer thickness which is required for the joining structure with respect to each of the terminal electrodes 21 to 28. For example, referring to FIG. 4, the layer thickness t3 of the extraction electrode B1 is larger than the layer thickness t1 of the internal electrode A1. Therefore, even if the layer thickness t1 of the internal electrode A1 is reduced, the layer thickness t3 required for the joining structure with respect to the terminal electrode 21 can be assured for the extraction electrode B1.

Therefore, the sufficient joining structure can be provided to each of the terminal electrodes 21 to 28, thus assuring the adhesion of the terminal electrodes 21 to 28 with respect to the ceramic porcelain 1. Accordingly, terminal electrode exfoliation due to a thermal shock can be avoided.

Although the illustrated embodiment is provided with the eight electrode layers 121 to 128, the present invention is not restricted to such a configuration, and the number of the electrode layers can take an arbitrary number equal to or above two.

Further, as described above with reference to FIG. 3, the electrode layers 121 to 128 include the dummy electrodes D11 to D83, and one end of each of these dummy electrodes is led onto the side surface of the ceramic porcelain 1 to be connected with a selected terminal electrode. For example, one end of each of the dummy electrodes D31, D51 and D71 is led onto the side surface of the ceramic porcelain 1 to be connected with the terminal electrode 21. Therefore, the terminal electrode 21 can be provided with the joining structure with respect to the extraction electrode B1 as well as the joining structure with respect to the dummy electrodes D31, D51 and D57, whereby the adhesion of the terminal electrode 21 with respect to the ceramic porcelain 1 can be increased. This is also applied to the other terminal electrodes 22 to 28.

Additionally, each of the dummy electrodes D11 to D83 has the same polarity as seen from the relationship with the internal electrode in the same layer. For example, the dummy electrodes D11 to D13 have the same polarity, i.e., the negative polarity as seen from the relationship with the internal electrode A1 (the negative polarity) in the same layer. Therefore, a short-circuit defect between the internal electrode A1 and the dummy electrodes D11 to D13 can be avoided. This is also applied to the other internal electrodes A2 to A8.

Although each of the dummy electrodes D11 to D83 is formed to have the same thickness as each of the internal electrodes A1 to A8 in the same layer in the illustrated embodiment, each of the dummy electrodes D11 to D83 may be formed to be thicker than each of the internal electrodes A1 to A8 in the same layer as different from the foregoing embodiment. According to this configuration, even if the number of layers is reduced or a layer thickness of each of the internal electrodes A1 to A8 is decreased to increase the ESR, a layer thickness required for the joining structure with respect to each of the terminal electrodes 21 to 28 can be assured for each of the dummy electrodes D11 to D83, thereby further increasing the adhesion of the terminal electrodes 21 to 28 with respect to the ceramic porcelain 1.

<Manufacturing Method of Multi-Terminal Type Laminated Capacitor>

An embodiment of a manufacturing method of a multi-terminal type laminated capacitor according to the present invention will now be described. This embodiment relates to a manufacturing method of the multi-terminal type laminated capacitor depicted in FIGS. 1 to 5.

Figure 6:
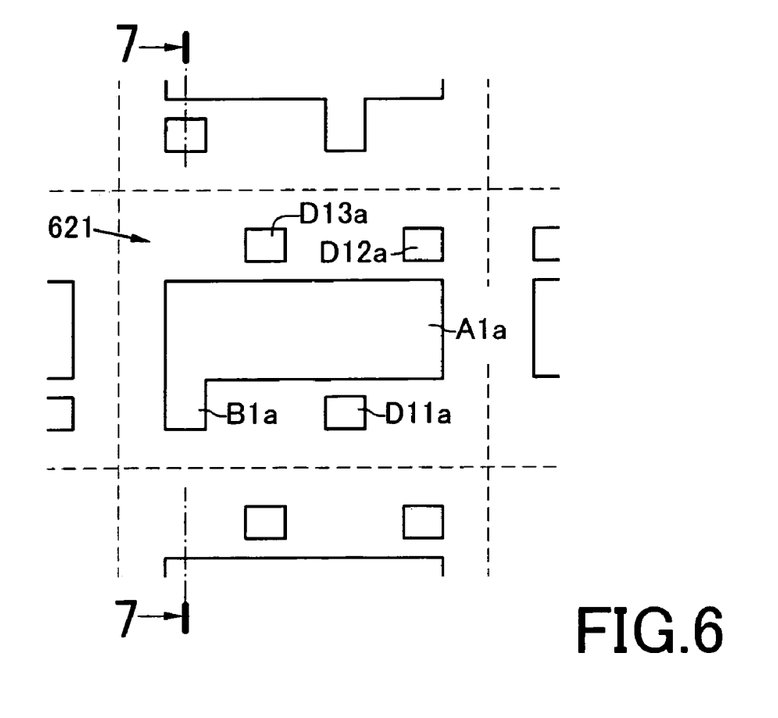
FIG. 6 is a view showing a step included in an embodiment of a manufacturing method of a multi-terminal type laminated capacitor according to the present invention.
Figure 7:
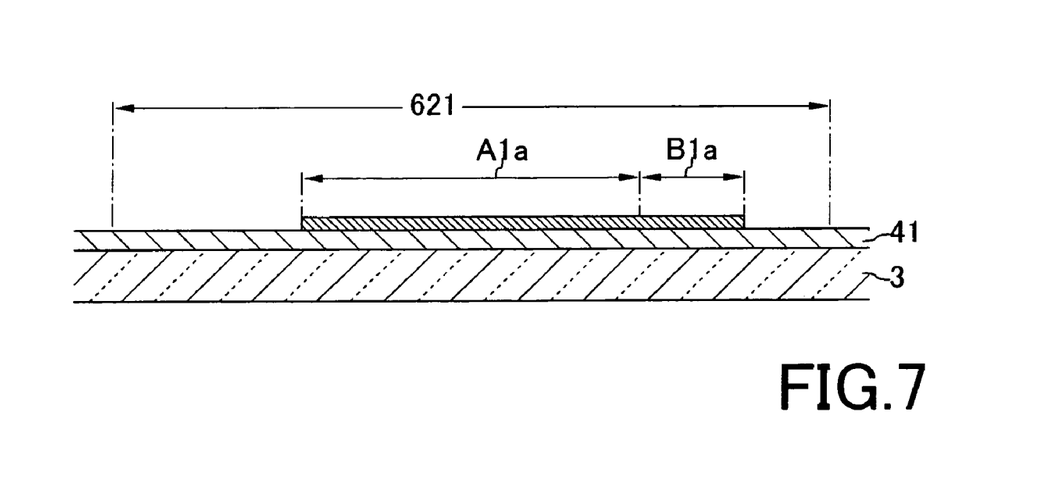
FIG. 7 is a partially enlarged end elevational view taken along a line 7-7 in FIG. 6.

FIG. 6 is a view showing a step included in one embodiment of a manufacturing method of a multi-terminal type laminated capacitor according to the present invention, and FIG. 7 is a partially enlarged end elevational view taken along a line 7-7 in FIG. 6. The drawings show a region 621 which is provided in one of electrode layers (e.g., an electrode layer 121) provided to a multi-terminal type laminated capacitor as a representative example.

Referring to FIGS. 6 and 7, an unbaked ceramic sheet (a ceramic green sheet) 41 is attached on one surface of a support 3. The unbaked ceramic sheet 41 is formed of a ceramic paste having a ceramic powder, a solvent, a binder and others mixed therein, and has a fixed thickness. Further, the support 3 is formed of an appropriate flexible plastic film.

Next, as shown in FIGS. 6 and 7, an internal electrode layer A1a, a first extraction electrode layer B1a and dummy electrode layers D11a to D13a are formed on the unbaked ceramic sheet 41 in a predetermined pattern. In the illustrated embodiment, the internal electrode layer A1a and the first extraction electrode layer B1a are integrally formed and have a predetermined thickness on the unbaked ceramic sheet 41. Furthermore, each of the dummy electrode layers D11a to D13a has the same thickness as the internal electrode layer A1a and the first extraction electrode layer B1a. These electrode layers are formed by printing a conductor paste. The conductor paste can be obtained by mixing a conductor powder, a solvent, a binder and others. As a printing method, there is a screen printing method, a gravure printing method, an offset printing method or the like.

Incidentally, although not shown, there are regions given to other electrode layers (e.g., electrode layers 122 to 128) around the region 621, and internal electrode layers A2a to A8a, first extraction electrode layers B2a to B8a and dummy electrode layers D21a to D83a are likewise formed in these regions.

Figure 8:
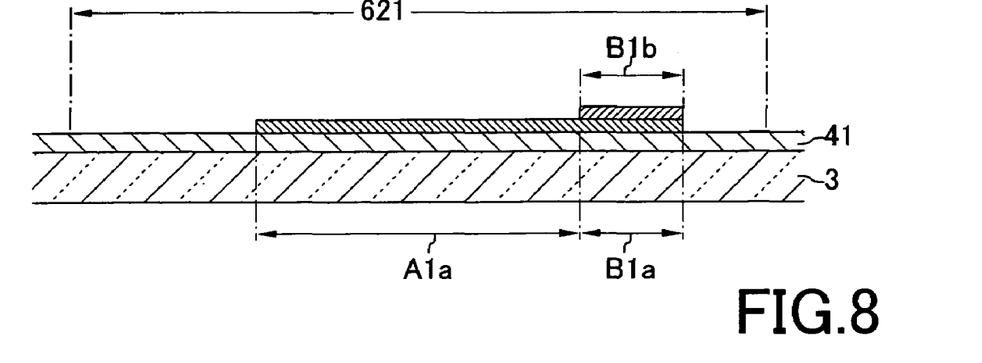
FIG. 8 is a view showing a step after the step depicted in FIGS. 6 and 7.

Subsequently, as shown in FIG. 8, a second extraction electrode layer B1b is formed on the first extraction electrode layer B1a. The second extraction electrode layer B1b is formed in the same shape pattern as the first extraction electrode layer B1a, and has a predetermined thickness on the first extraction electrode layer B1a. The second extraction electrode layer B1b is formed by printing a conductor paste like the internal electrode layer A1a and the first extraction electrode layer B1a. In the illustrated embodiment, the second extraction electrode layer B1b is constituted of a single layer. As different from this, the second electrode layer may be constituted of a plurality of layers, and the second extraction electrode layer having such a configuration can be obtained by repeating printing of the conductor paste more than once.

Figure 9:
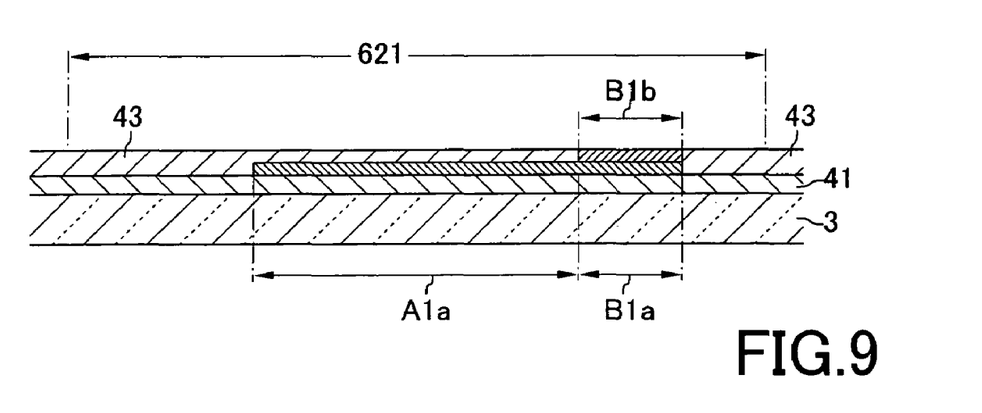
FIG. 9 is a view showing a step after the step depicted in FIG. 8.

Then, as shown in FIG. 9, a step absorption layer 43 is formed on the internal electrode layer A1a. The step absorption layer 43 functions to absorb a step generated between the internal electrode layer A1a and the second extraction electrode layer B1b. In the illustrated embodiment, the step absorption layer 43 is also provided in a margin region in which the internal electrode layer A1a, the first extraction electrode layer B1a and the dummy electrode layers D11a to D13a are not provided in the region 621 on the unbaked ceramic sheet 41, and functions to absorb a step produced between the margin region and the second extraction electrode layer B1b. It is preferable for a surface of the step absorption layer 43 to be formed at the same height position as a surface of the second extraction electrode layer B1b. The step absorption layer 43 is basically formed of a ceramic paste having the same configuration as the unbaked ceramic sheet 41.

Figure 10:
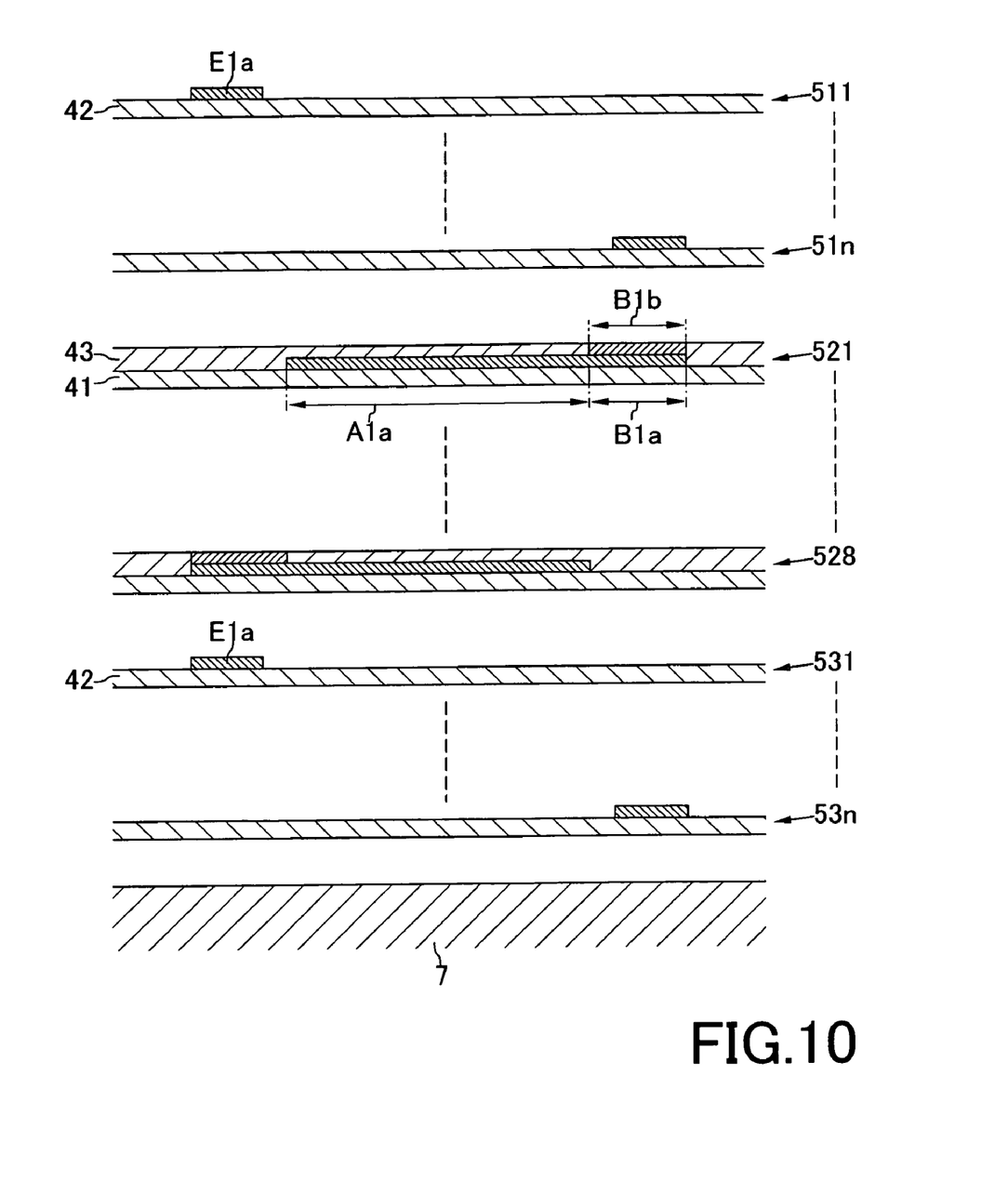
FIG. 10 is a view showing a step after the step depicted in FIG. 9.

Then, as shown in FIG. 10, a laminated body is formed such that the unbaked ceramic sheet 41 having the internal electrode layer A1a, the first and second extraction electrode layers B1a and B1b and the step absorption layer 43 formed thereon is used as each of unit layers 521 to 528 in the laminated body. In the illustrated embodiment, the laminated body is formed such that an unbaked ceramic sheet 42 having an outer layer dummy electrode layer E1a formed thereon is used as each of outer unit layers 511 to 51n and 531 to 53n in addition to these unit layers 521 to 528. In the illustrated embodiment, although a technique of superimposing the outer unit layers 511 to 51n, the unit layers 521 to 528 and the outer unit layers 531 to 53n on a lamination base 7 is adopted as a technique of configuring the laminated body, the present invention is not restricted this technique. For example, it is possible to adopt a technique of repeating the ceramic green sheet (the unbaked ceramic sheet) forming step or the electrode layer printing step on the flexible support for the necessary number of times.

When a pressure is applied to the thus obtained sheet laminated body and then cut into a one-chip region, a laminated green chip is obtained. Furthermore, when steps such as removal of the binder, baking, formation of a terminal electrode and others are carried out, the multi-terminal type laminated capacitor shown in FIGS. 1 to 5 can be obtained.

In the manufacturing method of the multi-terminal type laminated capacitor according to the present invention, the internal electrode layer A1$a$ and the first extraction electrode layer B1$a$ are formed on the unbaked ceramic sheet 41 as shown in FIGS. 6 and 7, and then the second extraction electrode layer B1$b$ is formed on the first extraction electrode layer B1$a$ as shown in FIG. 8. Therefore, there can be obtained a basic configuration including the internal electrode and the extraction electrodes each of which is formed to be thicker than the internal electrode in the same layer.

Thereafter, as shown in FIG. 10, the laminated body is formed with the unbaked ceramic sheet 41 having the internal electrode layer A1$a$ and the first and second extraction electrode layers B1$a$ and B1$b$ formed thereon being determined as each of the unit layers 521 to 528. Therefore, the multi-terminal type laminated capacitor according to the present invention can be formed. In detail, the unit layers 521 to 528 constitute the inner layer portion 12 of the ceramic porcelain 1 shown in FIG. 2, and the outer unit layers 511 to 51$n$ and 531 to 53$n$ constitute the outer layer portions 11 and 13 of the ceramic porcelain 1.

In case of the illustrated embodiment, the step absorption layer 43 made of the ceramic paste is formed on the internal electrode layer A1$a$ as shown in FIG. 9. Then, as shown in FIG. 10, the laminated body is formed with the unbaked ceramic sheet 41 having the internal electrode layer A1$a$, the first and second extraction electrode layers B1$a$ and B1$b$ and the step absorption layer 43 formed thereon being determined as each of the unit layers 521 to 528. According to this step absorption layer 43, a step generated between the internal electrode layer A1$a$ and the second extraction electrode layer B1$b$ can be absorbed.

In the configuration depicted in FIG. 9, although the surface of the step absorption layer 43 is formed at the same height position as the surface of the second extraction electrode layer B1$b$, the present invention is not restricted to this configuration. This point will become apparent from the fact that a step absorbing function can be obtained, for example, even if the surface of the step absorption layer is placed at a height position lower than the surface of the second extraction electrode layer.

What is claimed is:

1. A multi-terminal type laminated capacitor comprising:
a ceramic porcelain; and
a plurality of electrode layers superimposed in the ceramic porcelain with ceramic layers therebetween, wherein
each of the electrode layers includes an internal electrode and an extraction electrode for connection with a single terminal electrode, and
the extraction electrode has one end connected with the internal electrode in the same layer and the other end led onto a side surface of the ceramic porcelain, and is formed to be thicker than the internal electrode in the same layer.

2. The multi-terminal type laminated capacitor according to claim 1, wherein the extraction electrode is formed to be thicker than the internal electrode in the same layer in the vicinity of the side surface of the ceramic porcelain.

3. The multi-terminal type laminated capacitor according to claim 1, further comprising the terminal electrode provided on the side surface of the ceramic porcelain,
wherein at least one of the extraction electrodes has the other end connected with the terminal electrode.

4. The multi-terminal type laminated capacitor according to claim 1, wherein the electrode layer further includes a dummy electrode, and
the dummy electrode is arranged apart from the internal electrode and the extraction electrode in the same layer, and has one end led onto the side surface of the ceramic porcelain.

5. The multi-terminal type laminated capacitor according to claim 4, wherein, in at least one of the electrode layers, the dummy electrode has the same polarity as seen from a relationship with the internal electrode in the same layer.

6. The multi-terminal type laminated capacitor according to claim 1, wherein the ceramic porcelain has an inner layer portion having the electrode layers superimposed with the ceramic layers therebetween and an outer layer portion positioned outer as seen from the inner layer portion, and the outer layer portion having a dummy electrode layer, and
the dummy electrode layer includes an outer layer dummy electrode whose one end is led onto the side surface of the ceramic porcelain.

* * * * *